(12) United States Patent
Mcgrail et al.

(10) Patent No.: US 12,435,171 B2
(45) Date of Patent: Oct. 7, 2025

(54) CURABLE COMPOSITIONS AND LOW TACK, SELF-ADHERENT ADHESIVES PREPARED THEREFROM

(71) Applicant: Arkema France, Colombes (FR)

(72) Inventors: Brendan T. Mcgrail, Phoenixville, PA (US); Michael A. Bailey, Aston, PA (US); Mahendra Christopher Orilall, Downingtown, PA (US)

(73) Assignee: Arkema France, Puteaux (FR)

( * ) Notice: Subject to any disclaimer, the term of this patent is extended or adjusted under 35 U.S.C. 154(b) by 728 days.

(21) Appl. No.: 16/500,178

(22) PCT Filed: Mar. 21, 2018

(86) PCT No.: PCT/EP2018/057179
§ 371 (c)(1),
(2) Date: Oct. 2, 2019

(87) PCT Pub. No.: WO2018/184847
PCT Pub. Date: Oct. 11, 2018

(65) Prior Publication Data
US 2021/0115179 A1    Apr. 22, 2021

Related U.S. Application Data

(60) Provisional application No. 62/481,298, filed on Apr. 4, 2017.

(51) Int. Cl.
*C08F 283/00* (2006.01)
*B65D 33/18* (2006.01)
*C09J 151/08* (2006.01)

(52) U.S. Cl.
CPC .......... *C08F 283/008* (2013.01); *B65D 33/18* (2013.01); *C09J 151/08* (2013.01)

(58) Field of Classification Search
CPC .............. C08F 283/008; C08F 290/067; C08F 220/1818; C08F 220/286; C08F 222/102; B65D 33/18; C09J 151/08; C09J 7/38; C08G 2170/40; C08G 18/4825; C08G 18/61; C08G 18/755

See application file for complete search history.

(56) References Cited

U.S. PATENT DOCUMENTS

| | | | |
|---|---|---|---|
| 8,389,596 B2 | 3/2013 | Boyce et al. | |
| 8,763,890 B2 | 7/2014 | Clark et al. | |
| 9,382,461 B2 | 7/2016 | Boyce et al. | |
| 9,446,562 B2 * | 9/2016 | Sharygin | C08J 7/042 |
| 2004/0195967 A1 * | 10/2004 | Padiyath | H01L 51/5256 |
| | | | 313/512 |
| 2009/0169872 A1 * | 7/2009 | Krongauz | C08F 265/06 |
| | | | 427/508 |
| 2012/0100326 A1 * | 4/2012 | Sherman | C08G 71/04 |
| | | | 428/41.8 |
| 2016/0257472 A1 | 9/2016 | Boyce et al. | |
| 2021/0130637 A1 * | 5/2021 | Nagae | C09D 11/103 |

FOREIGN PATENT DOCUMENTS

| | | |
|---|---|---|
| EP | 1 375 617 A1 | 1/2004 |
| EP | 1 375 618 A1 | 1/2004 |
| EP | 1 736 519 A1 | 12/2006 |
| JP | 2001098226 A | 4/2001 |
| JP | 2004002533 A | 1/2004 |
| WO | WO-2007143343 A1 * | 12/2007 .......... B41M 7/0045 |

OTHER PUBLICATIONS

Machine English translation of KR20200121341A (Year: 2020).*
Isopropyl Myristate (IPM); POJ Chemical (Year: 2024).*
"CN9018 Technical Data Sheet", Sartomer, Sep. 20, 2024 (Year: 2024).*

* cited by examiner

*Primary Examiner* — Jessica M Roswell
(74) *Attorney, Agent, or Firm* — Christopher R. Lewis

(57) ABSTRACT

A low tack, self-adherent adhesive is obtained by curing a composition containing at least one acrylate-functionalized urethane oligomer, at least one poly(meth)acrylate-functionalized monomer and, optionally, at least one free radical initiator such as a photoinitiator or peroxide, but little or no hydrocarbon tackifying resin. Such adhesives are useful for producing reclosable packaging, wherein strips of adhesive are arranged in an opposed manner such that a package may be repeatedly opened and then resealed.

19 Claims, No Drawings

CURABLE COMPOSITIONS AND LOW TACK, SELF-ADHERENT ADHESIVES PREPARED THEREFROM

CROSS-REFERENCE TO RELATED APPLICATIONS

This application is a U.S. national stage application under 35 U.S.C. § 371 of PCT/EP2018/057179, filed Mar. 21, 2018, which claims the benefit of U.S. Patent Application No. 62/481,298, filed Apr. 4, 2017.

FIELD OF THE INVENTION

The present invention relates to compositions which are capable of being cured (for example, by irradiation) to obtain low tack, self-adherent adhesives that are useful in products in need of rebondable adhesives, such as reclosable packaging.

BACKGROUND OF THE INVENTION

Packaging, especially flexible packaging, is useful to retain food and other consumer products for shipping and storage. Flexible film packaging can have many advantages, as it can be manufactured at substantially lower cost than rigid containers, is light-weight resulting in reduced transportation costs and can pack easily resulting in reduced storage space compared to other types of rigid packaging.

Despite these advantages, product freshness and containment within the package can be an issue when more product is provided than desired by a consumer for a single use. Several types of closures and fasteners are available for reclosing a previously opened flexible package. It is common to use mechanical reclosable fasteners, such as slide zippers, clips, tabs, interlocking strips and the like.

Adhesive-based reclosable fasteners, such as those employing a pressure sensitive adhesive (PSA), can be an alternative to mechanical fasteners. For example, a high-tack adhesive layer can be applied to a package web/film surface and then covered by a releasable liner, which can be removed, when needed, by a user and the package closed by pressing the film against the adhesive layer. In certain end use applications, it may be desirable to employ a self-adherent adhesive, which is applied as a layer to each of two substrates which are then joined by pressing together an adhesive layer disposed on a first substrate and an adhesive layer disposed on a second substrate (or a different portion of the first substrate). In such a configuration, it will be desirable for the two adhesive layers to adhere firmly to each other, yet remain capable of being separated by peeling (without delamination of the adhesive layer from the substrate surfaces) and then resealed.

However, it has proven to be challenging to formulate adhesives for adhesive-based fasteners that are completely satisfactory. The adhesive can delaminate from a film substrate to which it is affixed, rather than peel at its cohesive interface. Further, many pressure sensitive adhesives have high tack levels. Tack is a property of an adhesive material that generally enables the material to form a bond with the surface of another material upon brief and/or light pressure. A high tack adhesive applied on the surface of a flexible film can cause problems during manufacturing in that the film used for packaging will not unwind freely from the roll stock. In use, particulate products contained within the flexible package can stick to the high tack PSA, thus reducing its adhesive effectiveness when resealing of the package is attempted. Additionally, an adhesive layer based on a high tack adhesive may undesirably adhere strongly to the fingers of a consumer who is attempting to open and then reseal a package. One attempt to resolve this problem is through the use of a lower tack adhesive, though this often increases the likelihood of delamination from the packaging film and interferes with the desired self-adherent properties of the adhesive.

Furthermore, although many conventional pressure sensitive adhesives are solvent borne, the manufacture and use of such solvent-based adhesives is disadvantageous due to the potential environmental and worker safety issues associated with the solvents used in such adhesives, which generally must be substantially removed following application of the adhesive formulation to a substrate surface. Accordingly, there has been interest in developing UV-curable compositions which are free of solvent and which can be converted into a suitable pressure sensitive adhesive by exposing the UV-curable compositions to ultraviolet light. Such UV-curable compositions are described, for example, in U.S. Pat. Nos. 8,389,596 and 9,382,461. These compositions include "UV-curable acrylic oligomer", "tack control component" (including hydrocarbon tackifier) and, optionally, "elastomeric material", wherein the weight percent of the UV-curable acrylic oligomer relative to the sum of the weight percents of the tack control component and the elastomeric material is required to be within the range of from about 0.5 to about 1.5.

SUMMARY OF THE INVENTION

Further improvements in solvent-free, curable compositions are still needed, however, in particular the development of compositions that do not require UV curing or that are capable of providing adhesives having higher peel strengths when cured.

Various exemplary, non-limiting aspects of the present invention may be summarized as follows:

Aspect 1: A Curable Composition, Comprising, Consisting Essentially of or Consisting of:
  a) at least one acrylate-functionalized urethane oligomer which, in homopolymerized form, has a glass transition temperature (Tg) less than 0° C.;
  b) at least one poly(meth)acrylate-functionalized monomer which, in homopolymerized form, has a glass transition temperature (Tg) of at least 20° C.;
  c) optionally, at least one free radical initiator (e.g., a photoinitiator or peroxide);
  wherein, if any hydrocarbon tackifier is present, the curable composition comprises not more than 5 weight % hydrocarbon tackifier, based on the total weight of the curable composition and when cured (e.g., by exposure to radiation) provides a low tack, self-adherent adhesive.

Aspect 2: The curable composition of Aspect 1, wherein the curable composition comprises less than 3 weight % hydrocarbon tackifier resin, based on the total weight of the curable composition.

Aspect 3: The curable composition of Aspect 1 or 2, wherein the curable composition comprises less than 1 weight % hydrocarbon tackifier resin, based on the total weight of the curable composition.

Aspect 4: The curable composition of any of Aspects 1-3, wherein acrylate-functionalized urethane oligomer and poly(meth)acrylate-functionalized monomer are present in the curable composition in amounts effective to provide a weight ratio of acrylate-functionalized urethane oligomer: poly(meth)acrylate-functionalized monomer of from about 3:1 to about 7:1.

Aspect 5: The curable composition of any of Aspects 1-4, wherein the at least one acrylate-functionalized urethane oligomer has an acrylate functionality greater than 1.

Aspect 6: The curable composition of any of Aspects 1-5, wherein the at least one acrylate-functionalized urethane oligomer has an acrylate functionality of from about 1.2 to about 2 or about 1.6 to about 1.8 (meaning number average acrylate functionality).

Aspect 7: The curable composition of any of Aspects 1-6, wherein the at least one acrylate-functionalized urethane oligomer has a number average molecular weight of from about 1500 g/mole to about 16,000 g/mole.

Aspect 8: The curable composition of any of Aspects 1-7, wherein the at least one acrylate-functionalized urethane oligomer is a siliconized acrylate-functionalized urethane oligomer.

Aspect 9: The curable composition of any of Aspects 1-7, wherein the at least one acrylate-functionalized urethane oligomer is an aliphatic acrylate-functionalized urethane oligomer.

Aspect 10: The curable composition of any of Aspects 1-9, wherein the at least one acrylate-functionalized urethane oligomer has an oligomeric backbone which is the reaction product of at least one diisocyanate and at least one diol selected from the group consisting of polyester diols, polypropylene glycols, and silicone-poly(propylene oxide) block copolyols (block copolymer polyols).

Aspect 11: The curable composition of Aspect 10, wherein the at least one diol is polyester polyol which is a condensation product of adipic acid and at least one glycol selected from the group consisting of $C_2$ to $C_6$ glycols.

Aspect 12: The curable composition of Aspect 10 or 11, wherein the at least one diisocyanate is isophorone diisocyanate.

Aspect 13: The curable composition of any of Aspects 1-12, wherein the at least one poly(meth)acrylated monomer consists of one or more di(meth)acrylated monomers.

Aspect 14: The curable composition of any of Aspects 1-13, wherein the at least one poly(meth)acrylated monomer consists of one or more di(meth)acrylated monomers each of which, in homopolymerized form, has a glass transition temperature of at least 40° C.

Aspect 15: The curable composition of any of Aspects 1-14, wherein when cured to provide an adhesive, the provided adhesive comprises soft polymeric domains derived from the acrylate-functionalized urethane oligomer and hard polymeric domains derived from the at least one poly(meth)acrylate-functionalized monomer.

Aspect 16: The curable composition of any of Aspects 1-15, wherein the at least one poly(meth)acrylate-functionalized monomer includes at least one monomer selected from the group consisting of polyethylene glycol diacrylates, ethoxylated bisphenol A dimethacrylates, 1,4-butanediol dimethacrylate and combinations thereof.

Aspect 17: The curable composition of any of Aspects 1-16, comprising not more than 25% by weight of monofunctional (meth)acrylate-functionalized monomer based on the total weight of the curable composition.

Aspect 18: The curable composition of any of Aspects 1-16, comprising isobornyl (meth)acrylate in an amount of up to 20% by weight based on the total weight of the curable composition.

Aspect 19: A method of making a low tack, self-adherent adhesive, comprising exposing the curable composition of any of Aspects 1-18 to an amount of radiation effective to cure the curable composition.

Aspect 20: The method of Aspect 19, wherein the radiation is selected from the group consisting of electron beam radiation and ultraviolet radiation.

Aspect 21: The low tack, self-adherent adhesive obtained by curing a curable composition in accordance with any of Aspects 1-18 or obtained by the method of Aspect 19 or 20.

Aspect 22: The low tack, self-adherent adhesive of Aspect 21, wherein the adhesive comprises soft domains derived from the acrylate-functionalized urethane oligomer and hard domains derived from the at least one poly(meth)acrylate-functionalized monomer.

Aspect 23: An article comprised of a substrate having adhered thereto at least one portion of the low tack, self-adherent adhesive of Aspect 21 or 22.

Aspect 24: The article of Aspect 23, wherein the substrate is comprised of a material selected from the group consisting of plastics, metals, ceramics, cellulosic materials and combinations thereof.

Aspect 25: The article of Aspect 23 or 24, wherein the article is a reclosable package comprising a fastener comprised of opposed portions of the low tack, self-adherent adhesive.

Aspect 26: A package having an adhesive-based reclosable fastener, the package comprising:
  walls forming a cavity for receiving one or more products;
  opposing panels of the walls;
  an adhesive-based reclosable fastener supplied from opposing portions of a cured low tack, self-adherent adhesive obtained by curing a curable composition in accordance with the present invention.

As previously mentioned, one aspect of the present invention provides a curable composition which is comprised of, consists essentially of or consists of the following components:
  a) at least one acrylate-functionalized urethane oligomer which, in homopolymerized form, has a glass transition temperature (Tg) less than 0° C.;
  b) at least one poly(meth)acrylate-functionalized monomer which, in homopolymerized form, has a glass transition temperature (Tg) greater than 20° C.;
  c) optionally, at least one free radical initiator (such as a photoinitiator or peroxide);
  wherein the curable composition comprises not more than 5 weight % hydrocarbon tackifier, based on the total weight of the curable composition and when cured provides a low tack, self-adherent adhesive.

DETAILED DESCRIPTION OF THE INVENTION

The various components of the curable composition may be selected and their relative proportions varied so as to provide a curable composition which is liquid at room temperature (25° C.) and which, in its uncured state, has a viscosity at 25° C. of 30,000 to 40,000 mPa·s (cP) in undiluted form or 1000 to 3500 mPa·s (cP) when diluted with 10-20 wt. % solvent (e.g., iso-propyl alcohol).

In preferred embodiments of the invention, the curable composition is formulated such that, upon curing, an adhesive is obtained which has negligible tack but strong adhesion to itself. In particular, the adhesive preferably simultaneously has a probe tack of less than 0.1 lbf (0.445N) (as measured by ASTM probe tack test D2979) and a t-peel strength to itself of at least 0.5 lbf per inch (0.876N/cm) (as measured by ASTM D1876). As used herein, the term "low tack" means a probe tack of less than 0.1 lbf (0.445N) as measured by ASTM probe tack test D2979. As used herein, the term "self adherent" means a t-peel strength to itself of at least 0.5 lbf per inch (0.876N/cm) as measured by ASTM D1876. In another embodiment, the adhesive preferably simultaneously has a probe tack of less than 0.05 lbf (0.222N) as measured by ASTM probe tack test D2979 and a t-peel strength to itself of at least 1 lbf per inch (1.75N/cm) as measured by ASTM D1876. In certain embodiments, the cured adhesive has a t-peel strength to itself of up to 4 lbf per inch (7 N/cm).

According to certain aspects of the invention, the curable composition contains at least two types of components: an acrylate-functionalized urethane oligomer (or combination of acrylate-functionalized urethane oligomers) and a poly(meth)acrylate-functionalized monomer (or combination of poly(meth)acrylate-functionalized monomers) that undergoes some degree of polymerization induced phase separation from the acrylate-functionalized urethane oligomer(s) when the composition is radiation-cured or which undergoes radiation-initiated polymerization at a rate sufficiently slower than the acrylate-functionalized urethane oligomer or which has a sufficiently low reactivity ratio with the acrylate-functionalized urethane oligomer that the final cured adhesive contains differentiable networks or domains, one of which is predominantly a soft (low Tg), acrylate-functionalized urethane oligomer-derived network or domain and the other of which is predominantly a hard (higher Tg) poly(meth)acrylate-functionalized monomer-derived network or domain.

Acrylate-Functionalized Urethane Oligomers

The curable compositions of the present invention contain at least one acrylate-functionalized urethane acrylate oligomer. Such substances are known in the art and are sometimes alternatively referred to as "urethane acrylate oligomers". They are characterized by having oligomeric urethane backbones or chains bearing one or more acrylate (—O—C(=O)CH=CH$_2$) functional groups, typically in terminal positions. The acrylate-functionalized urethane oligomer may be selected from a variety of materials, most desirably aliphatic urethane acrylates. Useful acrylate-functionalized urethane oligomers include di- or polyacrylate-functionalized urethane oligomers, which are capable of cross-linking during cure. Such di- or polyacrylate-functionalized urethane oligomers may be admixed with monoacrylate-functionalized urethane oligomers, in certain embodiments of the invention. The acrylate-functionalized urethane oligomer component of the present curable compositions may have an acrylate functionality of from about 1.2 to about 2 or from about 1.6 to about 1.8, for example. The term "acrylate functionality", as used herein, means, for a given weight of a substance (such as an acrylate-functionalized urethane oligomer or mixture of such oligomers), the ratio of the total moles of acrylate groups divided by the total number of moles of such substance, which is in fact the number average acrylate functionality.

The urethane portion of the acrylate-functionalized urethane oligomer may be prepared by the condensation reaction of at least one polyol (a reactant containing two or more hydroxy groups per molecule, which advantageously is an oligomeric substance such as a polyester polyol, polyether polyol, block copolyol of polysiloxane and polyether or the like) with at least one polyisocyanate. The molecular weight of the polyol(s) and polyisocyanate(s) and the stoichiometry between the polyol and polyisocyanate may be selected and controlled so as to provide a urethane prepolymer (urethane oligomer) of a molecular weight sufficient to attain an acrylate-functionalized urethane oligomer prepared therefrom of the desired number average molecular weight (Mn). Typically, it will be advantageous for the acrylate-functionalized urethane oligomer to have a number average molecular weight (Mn) of from about 1500 to about 16,000 g/mol. Number average molecular weight (Mn) may be determined using gel permeation chromatography and polystyrene standards. The reaction between the polyol and polyisocyanate typically is also controlled so as to provide a urethane prepolymer (urethane oligomer) having a reactive isocyanate (—NCO) group at least one terminal position, which can then be reacted with an acrylate-functionalized compound containing an isocyanate-reactive functional group such as a hydroxy group (e.g., a hydroxylalkyl acrylate such as hydroxyethyl acrylate).

Useful acrylate-functionalized urethane oligomers include acrylate-functionalized polyester urethane oligomers, in particular acrylate-functionalized aliphatic polyester urethane oligomers. Such oligomers generally may be described as the reaction products of at least one polyester polyol and at least one polyisocyanate.

Suitable polyester polyols include, for example, polyester polyols (in particular, aliphatic polyester polyols) prepared by the condensation reaction of one or more polyalcohols (e.g., glycols, in particular aliphatic glycols, e.g., $C_2$ to $C_6$ aliphatic diols) such as ethylene glycol, propylene glycol, 1,4-butanediol, neopentyl glycol and the like) and dicarboxylic acids (e.g., aliphatic dicarboxylic acids such as adipic acid). Other types of polyester polyols may also be employed, such as, for example, poly(ε-caprolactone) polyols.

Other types of polyols which may be utilized in preparation of the urethane portion of the acrylate-functionalized urethane oligomer include, but are not limited to, polyether polyols. Suitable polyether polyols include oligomers and polymers of straight or branched alkylene oxides having from one to twelve carbon atoms ($C_{1-12}$), such as ethylene oxide, propylene oxide and tetrahydrofuran prepared by methods known in the art. The polyether polyols may be homooligomers/polymers and/or cooligomers/polymers. In one embodiment, the polyol used is a so-called "siliconized" polyether polyol, containing siloxane repeating units, such as a hydroxy-functionalized block copolymer of an alkylene oxide such as propylene oxide and a siloxane (containing, for example, one or more poly(propylene oxide) blocks and one or more polysiloxane blocks).

The acrylate-functionalized urethane oligomer may also be based on other types of polyols, such as polycarbonate polyols and polydiene polyols. However, the polyol or polyols selected should be a polyol or combination of polyols that, once incorporated into the acrylate-functionalized urethane oligomer, provides an oligomer that when cured in a homopolymerization reaction (i.e., a polymerization in which no other reactive component is present) yields a polymer having a Tg less than 0° C., less than −10° C., less than −20° C., less than −30° C. or less than −40° C., in various advantageous embodiments of the invention.

The polyisocyanates used to prepare the acrylate-functionalized urethane oligomers include aliphatic polyisocyanates (which are generally preferred) and aromatic polyisocyanates having from 4 to 20 carbon atoms ($C_{4-20}$) and two or more isocyanate groups per molecule. Representative aliphatic examples include isophorone diisocyanate, dicyclohexylmethane-4,4'-diisocyanate, 1,4-tetramethylene diisocyanate, 1,5-pentamethylene diisocyanate, 1,6-hexamethylene diisocyanate, 1,7-heptamethylene diisocyanate, 1,8-octamethylene diisocyanate, 1,9-nonamethylene diisocyanate, 1,10-decamethylene diisocyanate, 2,2,4-trimethyl-1,5-pentamethylene diisocyanate, 2,2'-dimethyl-1,5-pentamethylene diisocyanate, 3-methoxy-1,6-hexamethylene diisocyanate, 3-butoxy-1,6-hexamethylene, omega, omega'-dipropylethyl diisocyanate, 1,4-cyclohexyl diisocyanate, 1,3-cyclohexyl diisocyanate, trimethylhexylnethylene diisocyanate and combinations thereof.

Suitable catalysts for reacting the polyol(s) with the polyisocyanate(s) to form the urethane portion of the acrylate-functionalized urethane oligomers include such materials as metal-containing catalysts and tertiary amine catalysts such as: dibutyl tin dilaurate, dibutyl tin oxide, dibutyl tin di-2-hexoate, stannous oleate and octoate, lead octoate, ferrous acetoacetate, triethylamine, diethylmethylamine, triethylenediamine, dimethylethylamine, morpholine, N-ethyl morpholine, piperazine, N,N-dimethyl benzylamine, N,N-dimethyl laurylamine and combinations thereof.

Acrylate-functionalized urethane oligomers suitable for use in the present invention are also available from commercial sources such as, for example, the Sartomer Americas business unit of The Arkema Group headquartered in Exton, Pennsylvania, U.S.A. Suitable Sartomer products include the acrylate-functionalized urethane oligomers sold under the designations CN 9023D, CN 990, CN 9800 and CN 9071.

In accordance with various exemplary aspects of the present invention, the acrylate-functionalized urethane oligomer(s) may be employed in an amount of about 50% to about 85% by weight of the total curable composition (exclusive of any non-reactive solvent that may be present).

Poly(Meth)Acrylate-Functionalized Monomers

In order to achieve an adhesive that is low in tack and yet exhibits a high degree of adherence both to itself and to substrates (in particular, plastic film substrates such as polyolefin films and composite/laminate plastic films), it has been discovered that the curable composition from which the adhesive is prepared should be formulated to contain at least some amount of poly(meth)acrylate-functionalized monomer which when polymerized as a homopolymer yields a polymer having a glass transition temperature (Tg) of at least 20° C. Without wishing to be bound by theory, it is believed that the inclusion of one or more such poly(meth)acrylate monomers in the curable composition helps to impart a desirable amount of tack to the surface of a cured composition obtained by curing of the curable composition (i.e., the poly(meth)acrylate monomer assists in controlling the surface tack of the adhesive).

As used herein, the term poly(meth)acrylate-functionalized monomer refers to a compound bearing two or more acrylate and/or methacrylate functional groups per molecule, but which does not contain any urethane groups (and thus is distinguishable from the acrylate-functionalized urethane oligomers previously described). According to one aspect, the poly(meth)acrylate-functionalized monomer contains two, three, four, five or six (meth)acrylate functional groups. For example, each of the poly(meth)acrylate-functionalized monomers present in the curable composition may contain two or three (meth)acrylate functional groups per molecule. In one particularly advantageous embodiment of the invention, each of the functional groups is a methacrylate functional group. In other embodiments, the poly(meth)acrylate-functionalized monomer or each of the poly(meth)acrylate-functionalized monomers (where more than one such monomer is present in the curable composition) has a Tg, when polymerized as a homopolymer, of at least 30° C., at least 40° C., at least 50° C., at least 60° C. or at least 70° C.

As used herein, the term "glass transition temperature" refers to the glass transition temperature of a substance as measured by Dynamic Mechanical Analysis (DMA), in particular the temperature corresponding to the peak of the tan delta curve as observed by DMA.

While achieving the above-mentioned desirable adhesive properties has been found to require the presence of at least some quantity of poly(meth)acrylate-functionalized monomer in the curable composition, at the same time it will be detrimental in some respects if the curable composition contains too large a proportion of poly(meth)acrylate-functionalized monomer relative to the amount of acrylate-functionalized urethane oligomer. If the level of poly(meth)acrylate-functionalized monomer is too high, the cured product obtained from the curable composition will be too brittle to adhere well to flexible substrates and/or will not have adequate self-adhesive properties.

Accordingly, in advantageous embodiments of the invention, acrylate-functionalized urethane oligomer and poly(meth)acrylate-functionalized monomer are present in the curable composition in amounts effective to provide a weight ratio of acrylate-functionalized urethane oligomer:poly(meth)acrylate-functionalized monomer of from about 3:1 to about 7:1 or about 4:1 to about 6:1.

It may also be desirable in at least certain embodiments of the invention to control the proportion of methacrylate functional groups to acrylate functional groups in the curable composition. If the level of methacrylate functional groups is too high relative to the level of acrylate functional groups, the curable composition may not cure completely during irradiation, resulting in an overly tacky adhesive that exhibits nonspecific tack to a variety of non-self substrates.

Suitable poly(meth)acrylate-functionalized monomers may be generally selected from acrylate and methacrylate esters of polyalcohols, such as glycols, oligomeric glycols, alkoxylated polyalcohols and the like. Exemplary poly(meth)acrylate-functionalized monomers include, but are not limited to, polyethylene glycol diacrylates (e.g., diethylene glycol diacrylate, triethylene glycol diacrylate, tetraethylene glycol diacrylate and combinations thereof), ethoxylated bisphenol A di(meth)acrylates (containing, for example, from about 1 to about 10 moles of reacted ethylene oxide per mole of bisphenol A), ethylene glycol dimethacrylate, 1,4-butanediol dimethacrylate, 1,6-hexanediol dimethacrylate and combinations thereof.

Generally speaking, the curable composition will be formulated such that the poly(meth)acrylate-functionalized monomer(s) in total constitute less than 50% by weight of the curable composition. For example, the curable composition may comprise from about 5% by weight to about 40% by weight poly(meth)acrylate-functionalized monomer, based on the total weight of the curable composition.

Without wishing to be bound by theory, it is believed that by selecting and using in combination the monomers and oligomers described herein, curable compositions can be formulated which, when cured (e.g., by exposure to radiation such as electron beam radiation or ultraviolet light or by chemical curing), yield adhesives comprising soft polymeric domains derived from the acrylate-functionalized urethane oligomer(s) and hard polymeric domains derived from the poly(meth)acrylate-functionalized monomer(s). A soft polymeric domain may be characterized as being rubbery or elastomeric in character, e.g., having a Tg less than 0° C., less than 10° C., less than 20° C., less than 30° C. or less than 40° C. In contrast, a hard polymeric domain may be characterized as non-rubbery or non-elastomeric and having a Tg higher than that of the soft polymeric domain, e.g., a Tg of at least 10° C., at least 20° C., at least 30° C., at least 40° C. or at least 50° C. The soft and hard polymeric domains may be interspersed in the cured adhesive.

While some degree of reaction may take place during curing between these two types of components, it has been found to be advantageous in certain embodiments of the invention to select the reactants and the curing conditions such that the acrylate-functionalized urethane oligomer molecules react predominantly with each other and the poly(meth)acrylate-functionalized monomer molecules react predominantly with each other. For example, the acrylate-functionalized urethane oligomer(s) and the poly(meth)acrylate-functionalized monomers may be selected such that the acrylate groups of the former component are significantly more reactive under the radiation curing conditions used than are the (meth)acrylate groups of the latter component.

Monofunctional (Meth)Acrylate-Functionalized Monomers

While it is possible for the curable composition to contain one or more mono-functional (meth)acrylate monomers (i.e., monomers containing only one acrylate or methacrylate functional group per molecule), in addition to the above-mentioned acrylate-functionalized urethane oligomers and poly(meth)acrylate-functionalized monomers, it is generally preferred for the total amount of such monofunctional (meth)acrylate monomer to be limited. For example, the curable composition may comprise not more than 25%, not more than 20%, not more than 15%, not more than 10%, not more than 5%, not more than 1% or even 0% by weight in total of mono-functional (meth)acrylate monomer, based on the total weight of the curable composition. A mono-functional (meth)acrylate monomer may be utilized as a reactive diluent in the curable compositions of the present invention. In particular, it may be advantageous to prepare the acrylate-functionalized urethane oligomer to be used in the curable adhesive as an admixture with a mono-functional (meth)acrylate monomer in order to reduce the viscosity of the acrylate-functionalized urethane oligomer and the curable composition prepared therefrom. For example, the acrylate-functionalized urethane oligomer may be diluted in 10-25% by weight (e.g., 15-20% by weight) mono-functional (meth)acrylate monomer, based on the weight of the acrylate-functionalized urethane oligomer. For example, isobornyl acrylate or a blend of isobornyl acrylate and isobornyl methacrylate may be utilized as the mono-functional (meth)acrylate monomer. According to one aspect of the invention, the curable composition is comprised of isobornyl (meth)acrylate in an amount of up to 20% by weight, based on the total weight of the curable composition. Isodecyl acrylate (e.g., in an amount of up to 8.5 wt. %, based on the total weight of the curable composition) or trimethyl cyclohexyl acrylate may also be used for such purpose. If a mono-functional (meth)acrylate monomer is present in the curable composition, the adhesion of the cured curable composition to a substrate surface may be improved by utilizing a mono-functional (meth)acrylate monomer which, in homopolymerized form, has a relatively high glass transition temperature (e.g., at least 30° C.), such as isobornyl (meth)acrylate.

Optional Photoinitiators

If the curable composition is to be cured using light, such as ultraviolet light, it will generally be desirable to formulate the composition to include one or more photoinitiators. However, if electron beam or chemical curing is employed, then the curable composition need not contain any photoinitiator.

A photoinitiator is a compound that undergoes a photoreaction on absorption of light, producing reactive species. The reactive species which are generated then initiate polymerization of the reactive components of the curable composition, e.g., the acrylate-functionalized urethane oligomer(s) and the poly(meth)acrylate-functionalized monomer(s). Generally speaking, such polymerization (curing) involves reaction of the carbon-carbon double bonds present in the (meth)acrylate functional groups of such components.

Suitable photoinitiators include, for example, alpha-hydroxy ketones, phenylglyoxylates, benzyldimethylketals, alpha-aminoketones, mono-acyl phosphines, bis-acyl phosphines, metallocenes, phosphine oxides, benzoin ethers and benzophenones and combinations thereof.

Specific examples of suitable photoinitiators include, but are not limited to, 2-methylanthraquinone, 2-ethylanthraquinone, 2-chloroanthraquinone, 2 benzyanthraquinone, 2-t-butylanthraquinone, 1,2-benzo-9,10-anthraquinone, benzyl, benzoin, benzoin methyl ether, benzoin ethyl ether, benzoin isopropyl ether, alpha-methylbenzoin, alpha-phenylbenzoin, Michler's ketone, benzophenone, 4,4'-bis-(diethylamino) benzophenone, acetophenone, 2,2 diethoxyacetophenone, diethoxyacetophenone, 2-isopropylthioxanthone, thioxanthone, diethyl thioxanthone, acetylnaphthalenes, ethyl-p-dimethylaminobenzoate, benzil ketone, α-hydroxy keto, 2,4,6-trimethylbenzoyldiphenyl phosphinoxide, benzyl dimethyl ketal, benzil ketal (2,2-dimethoxy-1,2-diphenylethanone), 1-hydroxycyclohexyl phenyl ketone, 2-methyl-1-[4-(methylthio)phenyl]-2-morpholinopropanone-1,2-hydroxy-2-methyl-1-phenyl-propanone, oligomeric α-hydroxy ketone, phenylbis(2,4,6-trimethylbenzoyl)phosphine oxide, ethyl-4-dimethylamino benzoate, ethyl(2,4,6-trimethylbenzoyl)phenyl phosphinate, anisoin, anthraquinone, anthraquinone-2-sulfonic acid, sodium salt monohydrate, (benzene) tricarbonylchromium, benzil, benzoin isobutyl ether, benzophenone/1-hydroxycyclohexyl phenyl ketone, 50/50 blend, 3,3',4,4'-benzophenonetetracarboxylicdianhydride, 4-benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberone, 4,4'-dihydroxybenzophenone, 2,2-dimethoxy-2-phenylacetophenone, 4-(dimethylamino)benzophenone, 4,4'-dimethylbenzyl, 2,5-dimethylbenzophenone, 3,4-dimethylbenzophenone, diphenyl(2,4,6-trimethylbenzoyl)phosphine oxide/2-hydroxy-2-methylpropiophenone, 50/50 blend, 4'-ethoxyacetophenone, 2,4,6-trimethylbenzoyldiphenylphosphine oxide, phenyl bis(2,4,6-trimethyl benzoyl) phosphine oxide, ferrocene, 3'-hydroxyacetophenone, 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methylbenzoylformate, 2-methyl-4'-(methylthio)-2-morpholinopropiophenone, phenanthrenequinone, 4'-phenoxyacetophenone, (cumene) cyclopentadienyl iron(ii) hexafluorophosphate, 9,10-diethoxy and 9,10-dibutoxyanthracene, 2-ethyl-9,10-dimethoxyanthracene, thioxanthen-9-one and combinations thereof.

Exemplary combinations of suitable photoinitiators include blends of 2-hydroxy-2-methyl-1-phenyl-1-propanone, 2,4,6-trimethylbenzoylphenylphosphinic acid ethyl ester and phenylbis(2,4,6-trimethylbenzoyl) phosphine oxide and blends of 2-hydroxy-2-methyl-1-phenyl-1-propanone and diphenyl (2,4,6-trimethylbenzoyl) phosphine oxide.

If photoinitiator is employed in the curable composition, it may generally be present in a total concentration of up to about 15% by weight based on the total weight of the curable composition.

Other Optional Free Radical Initiators

In other embodiments, the curable compositions described herein include at least one free radical initiator that decomposes when heated or in the presence of an accelerator and are curable chemically (i.e., without having to expose the curable composition to radiation). The at least one free radical initiator that decomposes when heated or in the presence of an accelerator (sometimes also referred to as an activator) may, for example, comprise a peroxide or azo compound. Suitable peroxides for this purpose may include any compound, in particular any organic compound, that contains at least one peroxy (—O—O—) moiety, such as, for example, dialkyl, diaryl and aryalkyl peroxides, hydroperoxides, percarbonates, peresters, peracids, acyl peroxides and the like. The at least one accelerator may comprise, for example, at least one tertiary amine and/or one or more other reducing agents based on metal salts (such as, for example, carboxylate salts of transition metals such as iron, cobalt, manganese, vanadium and the like and combinations thereof). The accelerator(s) may be selected so as to promote the decomposition of the free radical initiator at room or ambient temperature to generate active free radical species, such that curing of the curable composition is achieved without having to heat or bake the curable composition. In such an embodiment, it may be desirable to formulate the curable composition as a multi-part system, wherein the free radical initiator and accelerator are present in separate parts that are then combined when it is desired to prepare the curable composition (which will generally start curing upon mixing of the parts). In other embodiments, no accelerator is present and the curable composition is heated to a temperature effective to cause decomposition of the free radical initiator and to generate free radical species which initiate curing of the curable composition.

Other Optional Components

The curable compositions of the present invention may be formulated to contain one or more additional components or additives besides those described above. For example, the curable composition may additionally comprise at least one of: fillers (e.g., inorganic fillers, such as particulate inorganic fillers, including clays, organoclays, calcium carbonate, montmorillonite, silica and other silicon oxides, alumina and other aluminum oxides, titanium oxides, dolomite, talc, mica and the like), pigments, stabilizers, antioxidants, thickeners (thixotropes), rheology control agents, levelling agents, coupling agents and the like and combinations thereof.

One or more hydrocarbon tackifiers (also known as hydrocarbon tackifying agents, which do not contain any curable functional groups) may optionally be included in the curable composition to control or vary the tack properties of the cured adhesive obtained from the curable composition, as may be desired. Any of the conventional hydrocarbon tackifiers known in the pressure sensitive adhesive art may be used, such as, for example, terpene resins, rosin esters, terpene-phenol resins and aliphatic, cycloaliphatic and aromatic hydrogen resins (including $C_5$ aliphatic resins, $C_9$ aromatic resins, $C_5/C_9$ aliphatic/aromatic resins and hydrogenated hydrocarbon resins) and combinations thereof. However, in one desirable embodiment of the invention, the curable composition contains little or no hydrocarbon tackifier, e.g., less than 5%, less than 2%, less than 1%, less than 0.5% or even 0% by weight hydrocarbon tackifier, based on the total weight of the curable composition. It was surprisingly found that low tack adhesives having a high degree of self-adherence as well as adherence to substrates of the type typically used in flexible packaging (e.g., polyolefin films, such as polypropylene films, could be successfully formulated without hydrocarbon tackifier being present.

Although the curable composition could contain solvent (e.g., an organic solvent or water, in amounts of, for example, up to about 25% by weight based on the total weight of the curable composition), in preferred embodiments little or no non-reactive solvent is present. As used herein, the term "non-reactive solvent" means a solvent that does not react when the curable composition is irradiated (e.g., with ultraviolet light or electron beam radiation) or chemically cured. Accordingly, in desirable embodiments of the invention, the curable composition comprises less than 5%, less than 4%, less than 3%, less than 2%, less than 1%, less than 0.5%, less than 0.1% or even 0% by weight in total of non-reactive solvent, based on the total weight of the curable composition. Examples of suitable non-reactive solvents include, but are not limited to, ethers such as tetrahydrofuran and alcohols such as isopropyl alcohol.

Uses for the Curable Compositions

The curable compositions of the present invention are useful for producing low tack, self-adherent adhesives. The adhesives thereby obtained may be advantageously employed in applications wherein it is desired to adhere a first substrate to a second substrate, such that the first and second substrate are bonded or joined to each other in a releasable, re sealable manner. A layer of the adhesive may be formed on the surface of each substrate, with the applied adhesive layers then being pressed together to form a seal between the substrates as a result of the self-adherent characteristics of the adhesive. The seal can thereafter be broken (released) by separating the two substrates (by peeling the substrates apart, for example), with the layers of adhesive remaining on the separated substrate surfaces as a consequence of the stronger bonding of the adhesive layers to the substrate surfaces. The seal between the two substrates may be repeatedly formed and released.

In one aspect of the invention, the low tack, self-adherent adhesive may be used to provide reclosable fasteners comprising such adhesives and packages utilizing such reclosable fasteners. The reclosable fastener includes opposing layers, portions or patterns of the cured adhesive that releasably adhere together to close the package. The fastener secures to a package substrate with a sufficient bond strength such that the opposing layers of adhesive do not delaminate from the package substrate when opened, even though the cured adhesive has low tack. The adhesive used to form the fastener has a relatively high cohesive bond strength, but at the same time a relatively low tack so that it can function as an effective reclosable fastener even when exposed to crumbs, lint, food particles or other particulate matter. The opposing layers of adhesive can be applied on a variety of substrates, in particular substrates useful as packaging materials such as, for example, films, paperboard or other paper products, cardboard, foils, metal, laminates, flexible, rigid or semi-rigid plastic products or combinations thereof (including composite materials). Such materials can be used to create different types of packages or containers, including, for example, flexible pouches or bags, cartons or boxes, sleeves and clamshell packages and the like.

In one aspect, the curable composition used to manufacture the reclosable fastener is selected to have a composition that, once cured, is effective to minimize the adhesion of the fastener to undesired surfaces and still function at the same time as an effective reclosable fastener that does not delaminate. Accordingly, the cured adhesive possesses tack and peel properties which permit the reclosable fastener to be opened and closed multiple times while still effectively sealing the contents in the package, while at the same time avoiding delamination of the adhesive from the surface of the substrate. The cured adhesive is provided with relatively low tack levels to minimize adhesion to unwanted contaminants and a peel strength sufficient to enable secure reclosure of the package and enable repeated opening and reclosing of the package. At the same time, however, the cured adhesive adheres sufficiently strongly to the substrate surface (e.g., a substrate comprising part of a package) that the adhesive does not delaminate from the substrate surface upon opening of the package.

According to certain embodiments of the invention, a reclosable package is provided which is comprised of i) a first substrate having a first fastener surface coated with a first low tack, self-adherent adhesive obtained by curing a first layer of a first curable composition in accordance with the invention and ii) a second substrate having a second fastener surface coated with a second low tack, self-adherent adhesive obtained by curing a second layer of a second curable composition in accordance with the invention, wherein the first fastener surface and the second fastener surface are opposed to each other. The closing of the package may be obtained by pressing together the first fastener surface and the second fastener surface, whereby the first low tack, self-adherent adhesive releasably seals to the second low tack, self-adherent adhesive. The first substrate and the second substrate may be separate from each other (as in the case of a cup and a lid) or integral with each other (as in the case of a pouch formed from a film). The first curable composition and the second curable composition may be different from each other, but preferably are the same as each other.

Another aspect of the present invention provides a package having an adhesive-based reclosable fastener, the package comprising:

walls forming a cavity for receiving one or more products;
opposing panels of the walls;
an adhesive-based reclosable fastener supplied from opposing portions of a cured low tack, self-adherent adhesive obtained by curing a curable composition in accordance with the present invention. The opposing portions of cured low lack, self-adherent adhesive are positioned on opposing panels of the walls.

In addition to reclosable packaging, the low tack, self-adherent adhesive obtained by curing a curable composition in accordance with the present invention may be utilized in any other end use application wherein the formation of a releasable adhesive seal may be desired, such as in personal care articles (e.g., diapers and sanitary products).

In various embodiments of the present invention, the curable compositions described herein are curable by techniques selected from the group consisting of radiation curing (UV radiation or electron beam curing), chemical curing (using a free radical initiator that decomposes when heated or in the presence of an accelerator, e.g., peroxide curing), heat curing or combinations thereof.

In various embodiments of the invention, one or more layers of the curable composition (which will typically be in liquid form) can be applied to a substrate and then cured to form a solid adhesive, which will be adhered to the surface of the substrate (forming, for example, opposing adhesive layers). For example, after applying the curable composition to a substrate surface, the applied layer(s) of curable composition can be exposed to an effective amount of suitable radiation (e.g., electron beam radiation or ultraviolet light) to cure (polymerize) the curable composition, thereby forming the solid adhesive on the substrate. In one aspect, the thickness of the coating of curable composition can be in the range of about 0.0001 inches (0.000254 cm) to about 0.005 inches (0.0127 cm), but thicker coatings can be applied. In various embodiments of the invention, the curable compositions may be applied to a substrate by a method selected from the group consisting of spraying, knife coating, roller coating, casting, drum coating, dipping and combinations thereof. The entire substrate surface may be coated with a layer of the curable composition; in other embodiments, however, application of the curable composition is controlled so that a layer of the curable composition is present only on one or more pre-selected portions of the substrate surface. The coating of curable composition may be applied to a substrate (e.g., to a selected portion or portions of a package substrate) using high speed coating and printing lines. For example, the curable adhesive may be applied to a substrate (e.g., a film substrate) using conventional printing, roll coating, slot-die application techniques or other suitable application methods as needed for a particular application.

Preferred curing conditions, when the curable composition comprises at least one photoinitiator, include exposure to UV radiation from an iron-doped UV lamp (a D lamp) at 50-75 ft/min (15.24-22.86 m/min) or more preferably to a "D" lamp in series with a gallium-doped lamp (a V lamp) at about 50 ft/min (15.24 m/min). Generally speaking, samples cured using standard mercury vapor lamps (H lamps) were found to show lower adhesion to polyolefin substrates and weaker self-adhesion than samples cured using a D lamp or a combination of V and D lamps. Under electron beam-curing conditions, it was observed that the best performance was achieved at about 170 kV beam power and a dose of about 3 Mrad. The use of 160 kV beam power resulted in adhesive having a tacky surface and poor adhesion to polyolefin substrates.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable composition, the adhesive prepared from the curable composition or the processes for making or using the curable composition. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

The Following Formulation was Prepared:
- 76.47 g Sartomer CN 990 siliconized urethane acrylate oligomer
- 2.31 g Cray Valley Wingtack® 10 tackifier
- 7.97 g Sartomer SR 484 octyl decyl acrylate
- 5.17 g Sartomer SR 214 1,4-butanediol dimethacrylate
- 1.81 g BASF Irgacure® 2022 photoinitiator The components of the formulation were blended in a high-speed mixer for two minutes at 3000 rpm. The formulation was then drawn down to a thickness of 0.004 inch (0.0102 cm) using a drawdown bar on metalized oriented polypropylene (OPP) film coated with a heat seal layer. The coating of the formulation was cured in a single pass at 50 ft/min (15.24 m/min) using a Fusion V lamp. The film was then cut in half and the resulting two adhesive-coated faces were laminated together using a 1 lb. roller. The laminated film was slit into 1 inch (2.54 cm) wide strips and held at 70° F. (21.1° C.) and 50% relative humidity overnight.

The probe tack (measured using a 0.197 in. diameter stainless steel probe) was found to be 0.035±0.0065 kgf (0.343±0.0637N) based on three samples. The peel strength was 18.16±2.27 gf (0.178±0.0223N) based on three samples using the ASTM D1876 T-peel test. The samples were stable at 100-125% of initial release force for three cycles with no delamination from the substrate with 24 hr. dwell time between each peel test.

Example 2

The following formulation was prepared:
- 75.63 g Sartomer CN 9800 difunctional aliphatic silicone acrylate oligomer
- 2.61 g Cray Valley Wingtack® 10 tackifier
- 7.38 g Sartomer SR 484 octyl decyl acrylate
- 4.56 g Sartomer SR 214 1,4-butanediol dimethacrylate
- 1.78 g BASF Irgacure® 2022 photoinitiator The formulation was prepared, cured and tested using the procedures described in Example 1.

The probe tack was found to be 0.0167±0.00665 kgf (0.164±0.0652N) based on three samples. The initial peel strength was 0.04±0.03 lbf per inch (0.070±0.052N/cm) based on three samples. In initial peel tests, two samples remained attached to the substrate, while the third delaminated. The remaining two samples failed by delamination from the substrate after a second 24 hour dwell. It is believed that delamination occurred because the cured adhesive had better self-adhesion than adhesion to the substrate.

Examples 3-6

The formulations of Examples 3-6 were prepared, cured and tested in accordance with the procedures of Example 1, except that the coated substrates were cured in two passes at 50 ft/min (15.24 m/min) using a "D" bulb. The aliphatic urethane acrylate oligomer used contained polyester as part of the oligomer backbone, had an acrylate functionality of 1.6, a number average molecular weight of 7900 g/mol and a kinematic viscosity of 16,250 mPa·s (cP) at 60° C. The photoinitiator used in each case was PL4265, a 50:50 liquid blend of 2-hydroxy-2-methyl-1-phenyl-1-propanone and diphenyl (2,4,6-trimethylbenzoyl) phosphine oxide available from Esstech.

TABLE 1

| Component | Example 3 | Example 4 | Example 5 | Example 6 |
|---|---|---|---|---|
| Aliphatic Urethane Acrylate Oligomer, g | 19.80 | 19.51 | 19.56 | 28.64 |
| Ethoxylated Bisphenol A Dimethacrylate, g | 3.50 | — | — | 5.05 |
| Ethylene Glycol Dimethacrylate, g | — | 3.51 | — | — |
| PEG 400 Dimethacrylate, g | — | — | 3.56 | — |
| Photoinitiator, g | 1.30 | 1.21 | 1.27 | 1.46 |
| Properties | | | | |
| Tack, lbf. | 0.45 | 0.121 | 0.849 | 0.091 |
| Peel Strength (to self), lbf per inch | 2.51 | 1.25 | 1.29 | 2.22 |

Examples 7-9

The formulations of Examples 7-9 were prepared, cured and tested in accordance with the procedures of Examples 3-6. The aliphatic urethane acrylate oligomers used were as follows:

Aliphatic Urethane Acrylate Oligomer A: a urethane acrylate oligomer derived from poly(propylene oxide) polyol, having an acrylate functionality of 2 and a number average molecular weight of 4600 g/mol.

Aliphatic Urethane Acrylate Oligomer B: a urethane acrylate oligomer derived from silicone-poly(propylene oxide) block copolyol; acrylate functionality=1.6; number average molecular weight=8000 g/mol.

Aliphatic Urethane Acrylate Oligomer C: a urethane acrylate oligomer derived from poly(propylene oxide) polyol; acrylate functionality=1.6; number average molecular weight=6600 g/mol.

The photoinitiator used in each case was PL4265, a 50:50 liquid blend of 2-hydroxy-2-methyl-1-phenyl-1-propanone and diphenyl (2,4,6-trimethylbenzoyl) phosphine oxide available from Esstech.

TABLE 2

| Component | Example 7 | Example 8 | Example 9 |
|---|---|---|---|
| Aliphatic Urethane Acrylate Oligomer A, g | 90.02 | — | — |
| Aliphatic Urethane Acrylate Oligomer B, g | — | 28.96 | — |
| Aliphatic Urethane Acrylate Oligomer C, g | — | — | 34.93 |
| 1,4-Butanediol Dimethacrylate, g | 18.04 | 5.46 | 6.55 |
| Octyldecyl Acrylate, g | — | 1.52 | — |
| Photoinitiator, g | 3.34 | 1.45 | 1.66 |
| Properties | | | |
| Tack, lbf. | 0.8625 | 0.561 | 0.188 |
| Peel Strength (to self), lbf per inch | Delaminated from substrate | 0.063 | 0.026 |

The following Examples 10-18 illustrate embodiments of the invention in which the curable composition does not contain a photoinitiator, but is capable of being cured by exposure to electron beam radiation.

Example 10

The formulation of Example 1 s duplicated, except that the photoinitiator is omitted.

Example 11

The formulation of Example 2 is duplicated, except that the photoinitiator is omitted.

Example 12

The formulation of Example 3 is duplicated, except that the photoinitiator is omitted.

Example 13

The formulation of Example 4 is duplicated, except that the photoinitiator is omitted.

Example 14

The formulation of Example 5 is duplicated, except that the photoinitiator is omitted.

Example 15

The formulation of Example 6 is duplicated, except that the photoinitiator is omitted.

Example 16

The formulation of Example 7 is duplicated, except that the photoinitiator is omitted.

Example 17

The formulation of Example 8 is duplicated, except that the photoinitiator is omitted.

Example 18

The formulation of Example 9 is duplicated, except that the photoinitiator is omitted.

The following Examples 19-27 illustrate embodiments of the invention in which the curable composition contains a peroxide free radical initiator and an accelerator for the peroxide free radical initiator and is capable of being chemically cured.

Example 19

The formulation of Example 1 is duplicated, except that the photoinitiator is omitted and replaced with 0.3 g of cobalt octoate as an accelerator (activator) to comprise Part A and Part B comprising 1.25 g cumene hydroperoxide initiator, wherein Part B is combined with Part A to form a curable composition and initiate chemical curing of the curable composition.

Example 20

The formulation of Example 2 is duplicated, except that the photoinitiator is omitted and replaced with 0.3 g of cobalt octoate as an accelerator (activator) to comprise Part A and Part B comprising 1.25 g cumene hydroperoxide initiator, wherein Part B is combined with Part A to form a curable composition and initiate chemical curing of the curable composition.

Example 21

The formulation of Example 3 is duplicated, except that the photoinitiator is omitted and replaced with 0.3 g of cobalt octoate as an accelerator (activator) to comprise Part A and Part B comprising 1.25 g cumene hydroperoxide initiator, wherein Part B is combined with Part A to form a curable composition and initiate chemical curing of the curable composition.

Example 22

The formulation of Example 4 is duplicated, except that the photoinitiator is omitted and replaced with 0.3 g of cobalt octoate as an accelerator (activator) to comprise Part A and Part B comprising 1.25 g cumene hydroperoxide initiator, wherein Part B is combined with Part A to form a curable composition and initiate chemical curing of the curable composition.

Example 23

The formulation of Example 5 is duplicated, except that the photoinitiator is omitted and replaced with 0.3 g of cobalt octoate as an accelerator (activator) to comprise Part A and Part B comprising 1.25 g cumene hydroperoxide initiator, wherein Part B is combined with Part A to form a curable composition and initiate chemical curing of the curable composition.

Example 24

The formulation of Example 6 is duplicated, except that the photoinitiator is omitted and replaced with 0.3 g of cobalt octoate as an accelerator (activator) to comprise Part A and Part B comprising 1.25 g cumene hydroperoxide initiator, wherein Part B is combined with Part A to form a curable composition and initiate chemical curing of the curable composition.

Example 25

The formulation of Example 7 is duplicated, except that the photoinitiator is omitted and replaced with 0.3 g of cobalt octoate as an accelerator (activator) to comprise Part A and Part B comprising 1.25 g cumene hydroperoxide initiator, wherein Part B is combined with Part A to form a curable composition and initiate chemical curing of the curable composition.

Example 26

The formulation of Example 8 is duplicated, except that the photoinitiator is omitted and replaced with 0.3 g of cobalt octoate as an accelerator (activator) to comprise Part A and Part B comprising 1.25 g cumene hydroperoxide initiator, wherein Part B is combined with Part A to form a curable composition and initiate chemical curing of the curable composition.

Example 27

The formulation of Example 9 is duplicated, except that the photoinitiator is omitted and replaced with 0.3 g of cobalt octoate as an accelerator (activator) to comprise Part A and Part B comprising 1.25 g cumene hydroperoxide initiator, wherein Part B is combined with Part A to form a curable composition and initiate chemical curing of the curable composition.

The invention claimed is:

1. A curable composition, comprising:
   a) at least one acrylate-functionalized urethane oligomer which, in homopolymerized form, has a glass transition temperature less than 0° C.;
   b) at least one polymethacrylate-functionalized monomer comprising ethoxylated bisphenol A dimethacrylate which, in homopolymerized form, has a glass transition temperature of at least 20° C.;
   c) optionally, at least one free radical initiator;
   wherein the acrylate-functionalized urethane oligomer a) and the polymethacrylate-functionalized monomer b) are present in the curable composition in amounts effective to provide a weight ratio of acrylate-functionalized urethane oligomer a): polymethacrylate-functionalized monomer b) of from about 4:1 to about 7:1, and, if any hydrocarbon tackifier is present, the curable composition comprises not more than 5 weight % hydrocarbon tackifier, based on the total weight of the curable composition and when cured provides a low tack, self-adherent adhesive.

2. The curable composition of claim 1, wherein the curable composition comprises less than 3 weight % hydrocarbon tackifier resin, based on the total weight of the curable composition.

3. The curable composition of claim 1, wherein the at least one acrylate-functionalized urethane oligomer a) has an acrylate functionality greater than 1.

4. The curable composition of claim 1, wherein the at least one acrylate-functionalized urethane oligomer a) has a number average molecular weight of from about 1500 g/mole to about 16,000 g/mole.

5. The curable composition of claim 1, wherein the at least one acrylate-functionalized urethane oligomer a) is a siliconized acrylate-functionalized urethane oligomer.

6. The curable composition of claim 1, wherein the at least one acrylate-functionalized urethane oligomer a) is an aliphatic acrylate-functionalized urethane oligomer.

7. The curable composition of 1, wherein the at least one acrylate-functionalized urethane oligomer a) has an oligomeric backbone which is the reaction product of at least one diisocyanate and at least one diol selected from the group consisting of polyester diols, polypropylene glycols and silicone-poly(propylene oxide) block copolyols (block copolymer polyols).

8. The curable composition of claim 7, wherein the at least one diol is a polyester polyol which is a condensation product of adipic acid and at least one glycol selected from the group consisting of $C_2$ to $C_6$ glycols.

9. The curable composition of claim 7, wherein the at least one diisocyanate is isophorone diisocyanate.

10. The curable composition of claim 1, wherein the at least one polymethacrylate-functionalized monomer b) consists of one or more dimethacrylated monomers.

11. The curable composition of claim 1, wherein the at least one polymethacrylate-functionalized monomer b) consists of one or more dimethacrylated monomers each of which, in homopolymerized form, has a glass transition temperature of at least 40° C.

12. The curable composition of claim 1, wherein when cured to provide an adhesive, the provided adhesive comprises soft polymeric domains derived from the acrylate-functionalized urethane oligomer a) and hard polymeric domains derived from the at least one polymethacrylate-functionalized monomer b).

13. The curable composition of claim 1, wherein the at least one polymethacrylate-functionalized monomer b) further includes at least one monomer comprising 1,4-butanediol dimethacrylate.

14. The curable composition of claim 1, comprising not more than 25% by weight based on the total weight of the curable composition, of monofunctional (meth)acrylate-functionalized monomer.

15. A method of making a low tack, self-adherent adhesive, comprising exposing the curable composition of claim 1 to an amount of radiation effective to cure the curable composition.

16. A low tack, self-adherent adhesive obtained by curing a curable composition in accordance with claim 1.

17. An article comprised of a substrate having adhered thereto at least one portion of the low tack, self-adherent adhesive obtained by curing a curable composition of claim 16.

18. An article comprised of a substrate having adhered thereto at least one portion of the low tack, self-adherent adhesive obtained by curing a curable composition comprising:
   a) at least one acrylate-functionalized urethane oligomer which, in homopolymerized form, has a glass transition temperature less than 0° C.;
   b) at least one polymethacrylate-functionalized monomer which, in homopolymerized form, has a glass transition temperature of at least 20° C.;
   c) optionally, at least one free radical initiator;
   wherein the acrylate-functionalized urethane oligomer a) and the polymethacrylate-functionalized monomer b) are present in the curable composition in amounts effective to provide a weight ratio of acrylate-functionalized urethane oligomer a): polymethacrylate-functionalized monomer b) of from about 4:1 to about 7:1, and, if any hydrocarbon tackifier is present, the curable composition comprises not more than 5 weight % hydrocarbon tackifier, based on the total weight of the curable composition and when cured provides a low tack, self-adherent adhesive, wherein the article is a reclosable package comprising a fastener comprised of opposed portions of the low tack, self-adherent adhesive.

19. A package having an adhesive-based reclosable fastener, the package comprising:
   walls forming a cavity for receiving one or more products;
   opposing panels of the walls;
   an adhesive-based reclosable fastener supplied from opposing portions of a cured low tack, self-adherent adhesive obtained by curing a curable composition comprising:
   a) at least one acrylate-functionalized urethane oligomer which, in homopolymerized form, has a glass transition temperature less than 0° C.;
   b) at least one polymethacrylate-functionalized monomer which, in homopolymerized form, has a glass transition temperature of at least 20° C.;
   c) optionally, at least one free radical initiator;
   wherein the acrylate-functionalized urethane oligomer a) and the polymethacrylate-functionalized monomer b) are present in the curable composition in amounts effective to provide a weight ratio of acrylate-functionalized urethane oligomer a): polymethacrylate-functionalized monomer b) of from about 4:1 to about 7:1, and, if any hydrocarbon tackifier is present, the curable composition comprises not more than 5 weight % hydrocarbon tackifier, based on the total weight of the curable composition and when cured provides a low tack, self-adherent adhesive.

* * * * *